Sept. 2, 1969  E. J. ROVSEK  3,464,336
PHOTOGRAPHIC CAMERA USING MOTION PICTURE FILM FOR
SINGLE FRAME EXPOSURE
Filed Aug. 24, 1966  3 Sheets-Sheet 1
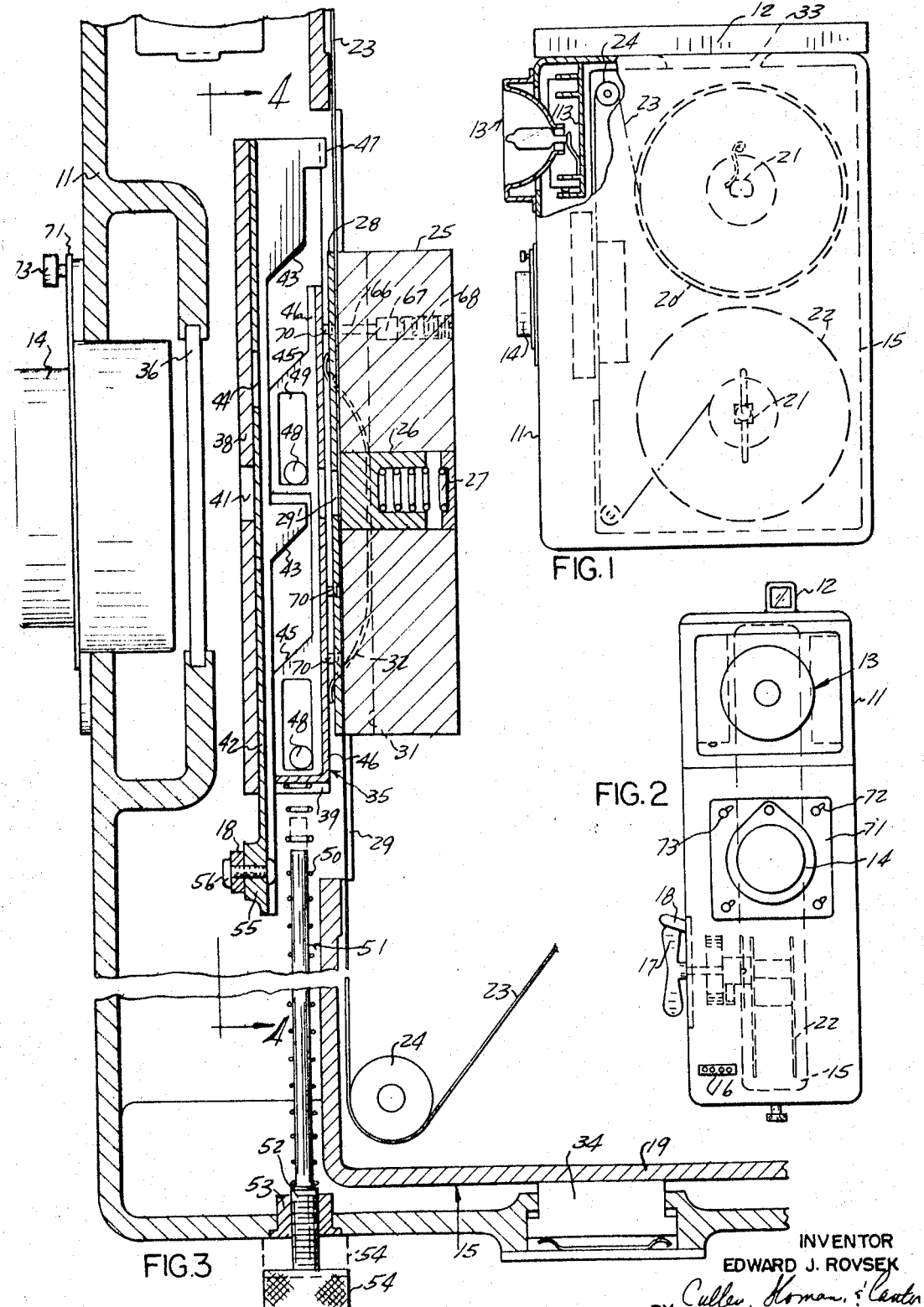
INVENTOR
EDWARD J. ROVSEK
BY  Cullen, Homan & Carter
ATTORNEYS

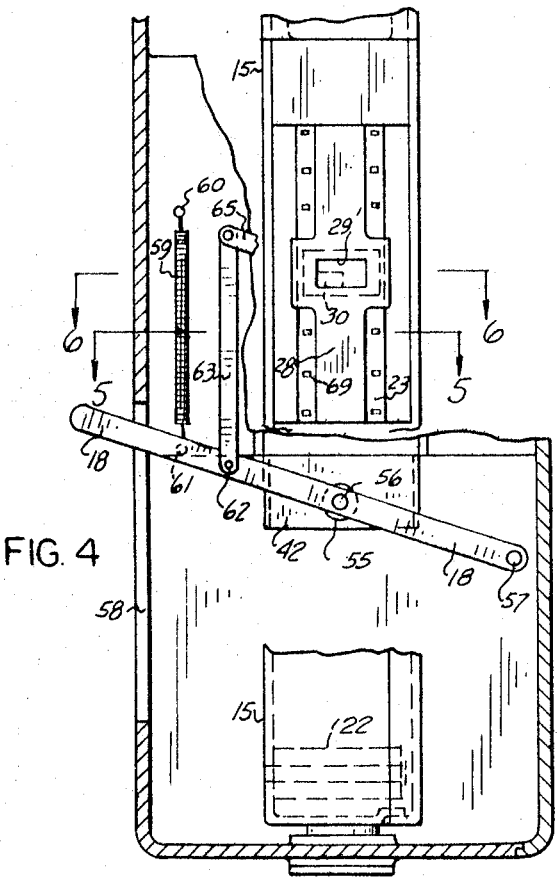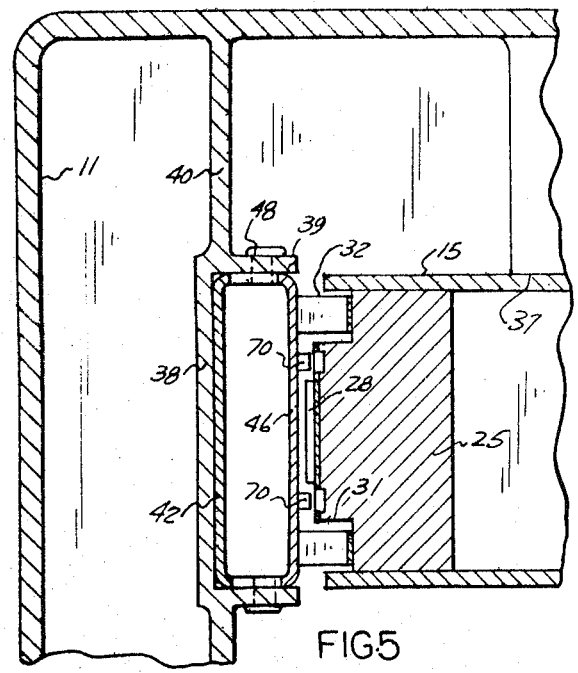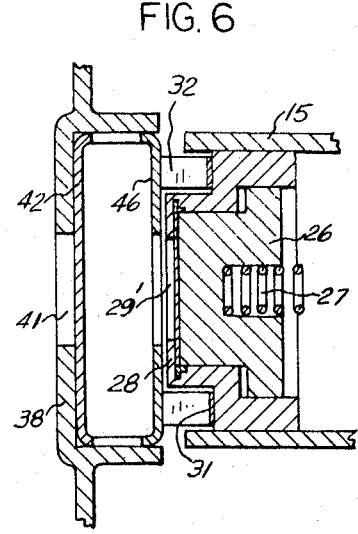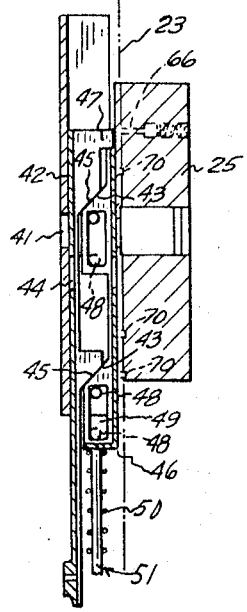

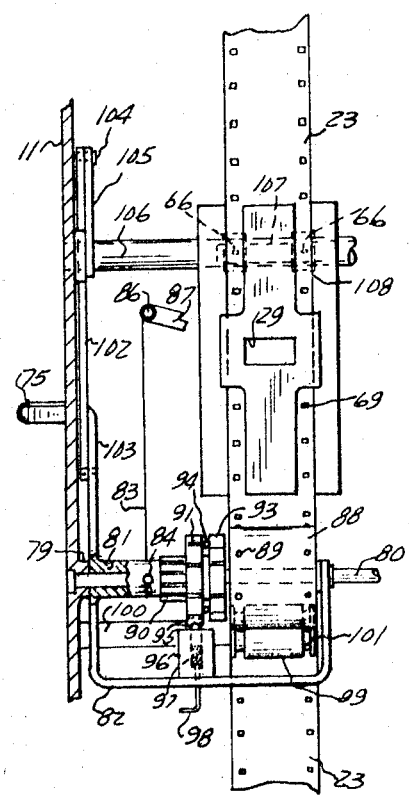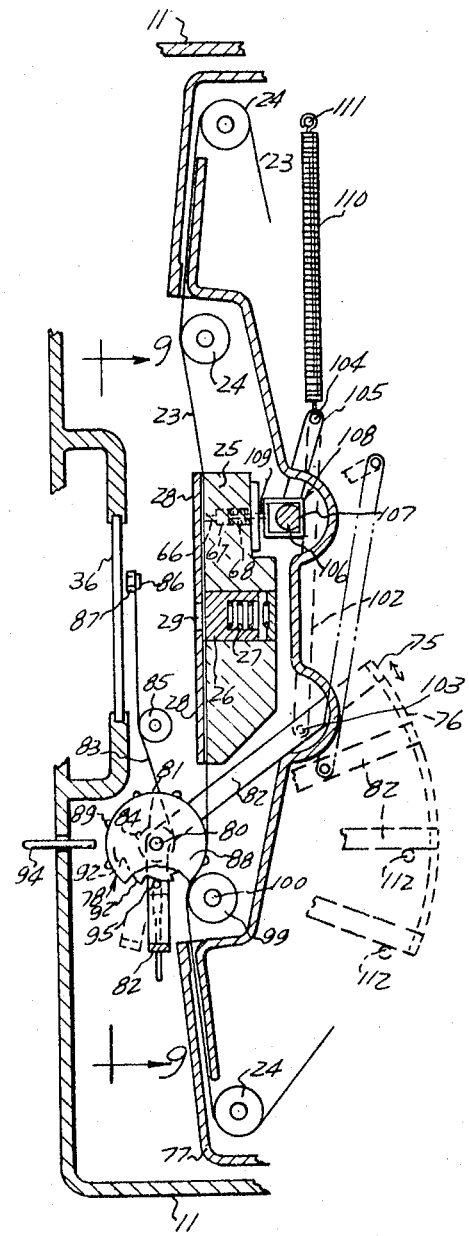

United States Patent Office 3,464,336
Patented Sept. 2, 1969

3,464,336
PHOTOGRAPHIC CAMERA USING MOTION PICTURE FILM FOR SINGLE FRAME EXPOSURE
Edward J. Rovsek, Elk Rapids, Mich. (423 W. 12th St., P.O. Box 243, Traverse City, Mich. 49684)
Filed Aug. 24, 1966, Ser. No. 580,846
Int. Cl. G03b *19/04, 21/32, 21/38*
U.S. Cl. 95—31                             19 Claims

ABSTRACT OF THE DISCLOSURE

A camera for taking single pictures using motion picture film, which includes a removable cartridge having a housing with an aperture and with film supply and take-up reels. A film support and a film stripper plate to receive the film is also provided in the cartridge. A manually operable device, independent of the cartridge, is adapted to first actuate the camera shutter and includes a film advance lever with a mechanism to move operatively into engagement with the film and for feeding the film a distance equal to one frame.

---

The present invention is directed to a camera construction, and more particularly, to a camera adapted to use motion picture film and designed to take single pictures only.

It is an object of the present invention to provide a camera construction which includes the usual lens and shutter assembly and incorporates a removable and replaceable motion picture-film cartridge and a manually operable means for effecting advancement of the film a single frame at a time.

It is a further object to incorporate in association with said manually operable means mechanism by which the camera shutter is activated for exposing a single film frame and for thereafter effecting a longitudinal advancement of the movie film a single frame for the next exposure thereof.

It is another object to provide within the present camera means for removably positioning a film cartridge mounting a motion picture type film for exposing a single frame at a time and in conjunction with a manually operable means which upon initial movement activates the camera shutter for exposing a single frame and which on further movement controls the action of operative film feeding means in registry with and in driving engagement with the film for moving the same forward a single frame at a time.

It is another object to provide a camera which will always be loaded. Fifty feet of 8-mm. motion picture film provides 4000 pictures, while fifty feet of 16-mm. motion picture film supplies 1000 pictures. This provides very inexpensive pictures. Using a single roll of 8-mm. motion picture film, one can take approximately 10 pictures a day for one year without reloading. The user can take three or four pictures of an important scene or landscape at different lens openings to assure at least one perfect picture. Pictures can be taken at will. There is no need to skimp and miss a picture you wish you had taken.

It is another object to provide a camera that is directed to those individuals who may be limited in taking pictures because of the high cost of film and developing.

It is another object to provide a film adapted to use motion picture film of a length between 1 and 100 feet as distinguished from the film of a conventional camera which at most is approximately 1 or 2 feet long. This permits travelers to use a single roll of film for all pictures taken on a trip.

It is the primary object of this invention to provide a camera designed to use a one frame at a time single picture exposure only, and not the continuous exposure feed as is used in a motion picture camera.

These and other objects will be seen from the following specification and claims in conjunction with the appended drawings in which:

FIG. 1 is a side elevational view of the present camera partially broken away.

FIG. 2 is a left elevational view thereof.

FIG. 3 is a vertical section through the central lens axis of the camera, on an increased scale.

FIG. 4 is a fragmentary, partially broken-away section taken essentially in the direction of the arrows 4—4 of FIG. 3.

FIG. 5 is a fragmentary section taken in the direction of arrows 5—5 of FIG. 4.

FIG. 6 is a fragmentary section taken in the direction of arrows 6—6 of FIG. 4.

FIG. 7 is a fragmentary, cross-sectional view corresponding to FIG. 3 illustrating the film advance cams in an advanced position.

FIG. 8 is a fragmentary, longitudinal section, partly broken away, illustrating a different form of manually operable means for feeding the film.

FIG. 9 is a fragmentary section taken generally in the direction of arrows 9—9 of FIG. 8.

It will be understood that the above drawings illustrate merely a preferred embodiment of the invention, and that other embodiments are contemplated within the scope of the claims hereafter set forth.

Referring to the drawing, and particularly FIGS. 1 through 7, while the present camera is shown for use of 8- or 16-mm. motion picture type film with either a 8-mm. or 16-mm. stripper plate, such camera is adapted to cover the use singly of 8-mm.; super 8-mm.; 16-mm.; 35-mm.; or in the case of foreign films, 8 x 11-mm.; or 9½-mm. motion picture film. The present camera is directed to mechanism for providing only single frame exposures of such film.

FIGS. 1 and 2 show the general details of the camera as including hollow frame 11; a suitable viewer 12; a conventional flash attachment generally indicated at 13; a conventional lens assembly 14; and removable, interchangeable cartridge 15 or magazine.

The camera frame also has mounted thereon a film frame counter 16, FIG. 2, suitably interconnected with the exposure mechanism, and includes also a conventional spring motor 17 for placing a spring bias as desired upon the film take-up reel 22, FIG. 1.

The manually operable means hereafter described in detail by which the film is advanced single frame successively includes manually operable film advance and shutter trip lever 18, FIG. 2.

Cartridge assembly

Cartridge 15 includes housing 19 with aperture 29 in its front wall, FIG. 3, in axial registry with lens assembly 14, and supports therein film supply and take-up reels 20 and 22 journalled at 21, and adapted for movably positioning the movie film 23. Said film extends around roller guides 24 and is adapted for movement past aperture 29 over and relative to support 25. Said support is mounted within housing 19 centrally of aperture 29. Pressure pad 26 is movably mounted within support 25 and is biased forwardly by spring 27 into operative engagement with movie film 23 normally urging the same against the elongated stripper plate 28. Said stripper plate is spaced over and secured to support 25 and includes a central portion having an opening 29', which in the illustrative embodiment, is adapted for registry with a single frame from a 16-mm. motion picture film. For single frame exposure of 8-mm. film a different cartridge would be used. The only difference would be the size and location of the opening. The opening for the 8-mm. film is indicated in dotted lines at 30, FIG. 4, for illustration.

The front face of support 25 has a pair of opposed, elongated slots 31 within which are mounted the forwardly projecting leaf springs 32 which extend past stripper plate 28 and are normally adapted for engagement in compression with the film feed assembly generally indicated at 35, FIG. 3, when the cartridge 15 has been properly inserted within the camera frame, FIG. 3. So inserted, the cartridge housing is retained by top boss 33, yieldable bottom stop 34, laterally positioned guide bosses 37, FIG. 5, and boss 113, FIG. 1, at the front of the camera frame. Aperture 29 in the front wall of the cartridge housing is in axial registry with the general longitudinal axis of the lens and shutter assembly, FIG. 3, the shutter being of a conventional construction, generally indicated at 36, and the detail thereof is omitted from the present disclosure, except that it is controlled by shutter lever 65, hereafter described in conjunction with FIG. 4.

Manually operable means for effecting single-frame feed movements of motion picture film Separate and independent from the removable head replaceable cartridge 15 for the camera and incorporated within the general camera construction is a manually operable means for effecting a longitudinal incremental single-frame feed movement of the motion picture film under manual control. One construction is shown for effecting such feed movements in FIGS. 3 through 7, and an alternate roller form of feed is shown in FIGS. 8 and 9.

Forming a part of the manually operable means for effecting the longitudinal incremental one-frame feed movements of the motion picture film is an elongated channel-shaped cam guide housing 38, best shown in FIG. 5, which is stationary to camera frame 11 and arranged forwardly of the cartridge aperture 29, and its own centrally arranged aperture 41 in registry with the lens axis, FIG. 3.

The cam guide housing 38, FIG. 5, includes a pair of opposed parallel inwardly extending walls 39 and support web 40 forming a part of the camera frame.

The longitudinally reciprocal plate 42, hereafter referred to as a second cam plate, is guidably mounted within channel housing 38 and includes a pair of film advance 45° drive cams 43, FIG. 3. Said second cam plate includes a central aperture 44 adapted for registry with the lens assembly during film exposure.

The longitudinally spaced pair of 45° film drive cams are normally spaced from a second pair of film advance 45° cams 45 upon first cam plate 46. Cam plate 46 as shown in FIG. 5 is arranged in opposed relation to second cam plate 42, is generally of U-shape in cross-section, and is reciprocally mounted within guide housing 38 for longitudinal movement under the control of the transverse dog 47 forming a part of second cam plate 42, FIG. 3.

A pair of cam retaining pins 48 extend from sidewalls 39 of housing 38 and loosely into a pair of longitudinally spaced guide slots 49 in the first cam plate to provide a means to permit transverse or lateral movements of first cam plate 46 with respect to second cam plate 42. Initial contact of the drive cams 43 with driven cams 45 on first cam plate 46 effects this transverse movement. Said first cam plate is free for longitudinal movement, as indicated in FIG. 7. First cam plate 46 includes a central aperture adapted for registry with the lens assembly during film exposure.

As shown in FIG. 3, a cylindrical coil spring 50 is mounted around the elongated cam stop pin 51 and extends into operative yielding expansive registry with first cam plate 46, normally resisting longitudinal movement thereof under the control of the second cam plate; and is adapted furthermore for returning the first cam plate to inoperative position, FIG. 3, after the manually operable means for advancing the film has been released or returned to its inoperative position, FIG. 4.

The stop 51 has a shoulder 52 which is threaded through bushing 53 in the camera frame, and terminates in the knob 54 by which stop 51 may be longitudinally adjusted from the solid line position shown in FIG. 3, which corresponds to the stop setting when a 16-mm. film is used or to the dotted line position 54 of the said knob and the inner end of the stop shaft 51 corresponding to the stop desired when an 8-mm. film is employed and wherein the longitudinal feed movement of the film is one-half the normal distance for advancing the film one frame at a time.

Forming a part of the manually operable feed means, the second cam plate 42 has on one end the transversely extending boss 55, which through pin 56 is pivotally connected to the film advance and shutter trip lever 18.

Said lever, FIG. 4, is pivotally mounted at one end at 57 within the camera frame and at its other end projects outwardly through an elongated slot 58 formed in the camera frame.

The coil spring 59 anchored at 60 within the frame at its opposite end is connected at 61 to the said film advance and shutter trip lever 18 normally maintaining the lever in the inoperative position shown in FIG. 4.

The link 63 pivotally connected at one end at 62 to the lever 18, at its opposite end is pivotally connected as at 64 to the shutter control lever 65, FIG. 4, and, accordingly, initial longitudinal movement of the lever 18 within the slot 58 for a limited short distance trips the shutter mechanism 36 for exposing a single motion picture film frame through the respective above-described apertures and through the lens assembly. But further longitudinal movement in the same direction of the lever 18 causes corresponding longitudinal movement of second cam plate 41 into operative engagement with first cam plate 46 and with the control dog 47 adjacent the inner end of said first cam plate. Thus, the initial movement of lever 18 in tripping the shutter, moves the cams 43 quite a distance before operative engagement with cams 45 on first cam plate 46. At this time, initial engagement of the respective cam surfaces causes first cam plate 46 to move transversely from the film exposure position shown in FIG. 3 against the resiliency of leaf springs 32. Additional longitudinal movement of second cam plate 42 causes dog 47 to effect rectilinear longitudinal continued movement of first cam plate 46 producing a longitudinal feed movement of film 23, such feed movement being limited by engagement of cam plate 46 with adjustable stop 51, FIG. 7.

Positioned within the support 25 forming a part of the cartridge are a pair of positioning pins 66, including shoulder 67 normally biased forwardly by the coil spring 68, FIG. 3, with the said pins interlockingly extending into the corresponding marginal apertures of the film for anchoring the same in position during exposure of a single frame thereon.

Just subsequent to the exposure, on continued movement of lever 18, cams 43 and 45 cause the first cam plate to move transversely causing a simultaneous transverse movement of a plurality of spaced pairs of film drive pins 70 connected therewith for interlocking engagement within the corresponding sprocket holes 69 in the margins of the film as it bears against support 25 being retained by stripper plate 28.

In this connection and with reference to FIG. 3, at least one pair of the film drive pins 70 on cam plate 46 are in axial registry with the respective film positioning pins 66 and, accordingly, upon transverse movement of the first cam plate, move the positioning pins 66 inwardly against the biasing springs to thus disengage the positioning pins from the film and at the same time the respective film drive pins 70 are interlocked with corresponding pairs of apertures 69 or sprocket holes in the film. Thus, continued longitudinal movement of the first cam plate to the position shown in FIG. 7 causes advance movement of the film 23 a distance corresponding to exactly one frame, thus positioning a new and unexposed film frame in correct registry with the lens axis for subsequent exposure on subsequent actuation of the shutter which, of course, immediately closes after it has been tripped to avoid a second exposure.

After the manual movement of the lever 18 feeding the film, it may be released and returned to the inoperative position shown in FIG. 4 under the action of coil spring 59. This results in return of second cam plate 42 to the inoperative position shown in FIG. 3. With cam pressure released from cams 45, first cam plate 46 is now biased transversely and forwardly under the action of the springs 32 so that the film drive pins 70 have been disengaged from the film which remains in its advance position. Spring 50 retracts cam plate 46 to inoperative position at the same time the positioning pins 66 under spring bias 68 now again interlock with sprocket apertures 69 in the film for anchoring the film in position for the next exposure, completing the cycle.

As above described, if a new cartridge is inserted with a stripper plate for use, for example, with an 8-mm. film, the stripper plate opening is designated in FIG. 4 at 30 in dotted lines, being displaced laterally from the longitudinal axis of the stripper plate opening 29′ when employed with a 16-mm. film. This is because when employing 8-mm. film the aperture 30 is one-quarter the total area of the aperture 29′. This requires that there be an adjustment of the lens assembly so as to be in longitudinal registry with the axis of the 8-mm. film and the corresponding axis of the stripper plate opening 30. This is accomplished by means of the lens mounting plate 71, which has a series of angular mounting slots 72 and which receive the securing screws 73 and which, upon loosening, permit transverse adjustment of the lens assembly 14 as desired to accommodate the stripper plate whose aperture 30 corresponds to an 8-mm. film.

Modifications—FIGURES 8 and 9

FIGURES 8 and 9 illustrate, fragmentarily, but without repetition of common parts, a different type of manually operable feed means for the film for effecting incremental, single-frame advance movements thereof, namely, a roller-type of action. Said film feed assembly being generally designated at 78, FIG. 8.

A film advance and shutter trip lever includes a master lever 82 of general U-shape having upon one side of the U a laterally extending journal 81 and on the same side an out-turned handle 75 adapted for rotary reciprocal movements within slot 76 in the frame 11, fragmentarily shown.

These reciprocal movements of the lever handle 75 acting through the manually operable means now to be described are adapted for effecting incremental, one-frame-at-a-time advance movement of the film 23 similarily guided over rollers 24 forming a part of the replaceable movie film cartridge 77 within the camera frame best illustrated in FIG. 8.

The aperture boss 79, FIG. 9, supports the laterally extending journal rod 80 upon which is rotatably mounted the journal 81 forming a part of U-shaped master lever 82.

The shutter trip cable 83 extends around bearing 81 and is secured thereto at 84 at one end of said cable, and at its other end is secured, as at 86, to one end of a shutter lever 87 for tripping the same with respect to the shutter 36 schematically shown in FIG. 8, which functions in a conventional manner. It is noted that each initial rotary movement of the handle 75 of the master lever 82 causes a longitudinal pull upon the cable 83 for tripping the shutter lever 87 for film exposure, said cable being guided over roller 85, FIG. 8.

Film advance wheel 88 has mounted thereon a series of pairs of opposed sprocket buttons 89 adapted for continuous cooperative registry with the corresponding marginal apertures 69 of the film for feeding the same, FIG. 8.

The film advance wheel 88 has an axial, exteriorally splined shaft 90 and is rotatably journalled upon the journal rod 80 being positioned between lever journal 81 on the one side and the opposing leg of the master lever 82, FIG. 9.

The 16-mm. ratchet wheel 91, with teeth 92, FIG. 8, and the laterally interconnected 8-mm. ratchet wheel 93 are both slidably keyed or splined to the spline shaft 90 and are adapted for longitudinal adjustment thereon, under the control of shifter fork 94 connected thereto. This provides a means for selectively positioning either the 16-mm. film drive ratchet or the 8-mm. film drive ratchet relative to the yieldably mounted ratchet drive pin 95 movably mounted within the boss 96 connected with the bight portion of master lever 82, being normally spring-biased into engagement with the respective ratchet wheel by spring 97, but including a pull pin 98 by which the ratchet drivepin may be changed for registry with either of the ratchet wheels 91 or 93.

The motion picture film as driven by the sprockets 89 of the film feed wheel 88 passes over the film roller 99 upon stud shaft 100 mounted on the camera frame. Said film roller has a pair of laterally spaced annular grooves 101 to accommodate and provide a clearance for the rotating sprockets 89.

The coupling link 102 is pivotally connected at 103 to lever handle 75–82 and at its opposite end is connected as at 104 to the retracting spring 110 anchored at 111 within the camera frame. This normally biases and maintains the master lever and associated handle 75 in the inoperative preexposure position, FIG. 8.

As previously disclosed in connection with FIG. 3, there is also provided a pair of film positioning pins 66 each having a headed portion 67 normally biased inwardly within support 25 by coiled springs 68 for interlocking registry within an opposed pair of apertures 69 in the film for anchoring the film during exposure. The present master lever has connected therewith an additional linkage by which initial rotary movement of the handle 75 causes a retraction of the positioning pins 66 so that on continued rotary movement of said handle activating a ratchet wheel 91, the film may be fed one film frame until the master lever handle 75 engages one of the stop pins 112, which are retractable.

As shown in FIG. 8, a central pin corresponds to the use of the ratchet wheel 93 for the feed movement of 8-mm. film whereas the other retractable stop pin 112 is used in conjunction with ratchet wheel 91 for feeding of 16-mm. film, which requires double the feed distance for the movement of a single frame past the axis of the camera lens and for positioning the succeeding unexposed film frame into registry with the lens axis for the next exposure.

Means are provided for effecting a retraction of the pins 66 which position the film during the exposure period. This means includes the yoke link 105 which is pivoted at 104 to the coupling link and at its other end is fixedly secured to the scotch yoke shaft 106.

A portion of the said shaft is flattened as at 107, FIG. 8, and is positioned relative to the base portions of a pair of laterally spaced scotch yokes 108, fixedly secured at 109 to the outer ends of positioning pins 66. Accordingly, initial rotary movement of handle 75 acting through coupling link 102 and yoke link 105 rotates the scotch yoke shaft 106 so that its portions of increased diameter engage the scotch yokes causing a lateral retracting movement of the respective positioning pins 66 disengaging same from the film. Continued rotary movement in the same direction of the handle 75 causes the master lever to continue rotating and through ratchet drive pin 95 activates ratchet wheel 91 connected with the film advance wheel 88 for effecting just the right amount of rotary motion as will feed the film exactly one film frame. This moves the exposed film frame away from aperture 29' in the stripper plate 28 relative to the lens axis and moves the succeeding new unexposed film frame directly into registry therewith.

The handle 75 under spring bias 110 then returns to its inoperative position, moving through the arcuate slot 76, FIG. 8. Such return movement causes the ratchet drive pin 95 to merely ride over the adjacent sprocket tooth for repositioning relative thereto for the next actuation of the handle 75 and master lever 82. This return movement of lever 82 also returns the shutter trip cable to its initial inoperative position ready for the next film frame exposure.

By the present construction shown in FIGS. 8 and 9, or in the other FIGS. 1 through 7, a means is provided by which motion picture type of film can be exposed in the present camera one frame at a time. This means that a person on an extended trip using motion picture film would never have to change the film cartridge and could thus provide a large number of exposed, individual still pictures upon the motion picture type of film.

Development of the film roll in the conventional manner is very inexpensive taking into consideration that for this motion picture film there is in effect a still picture exposed upon each film frame and that these may be developed to provide transparencies upon a continuous film which are capable of projection upon a screen or, if desired, can be used for obtaining positive individual prints.

The present invention is thus devoted to a camera to provide single picture exposures using motion picture film.

One single roll of double 8-mm. film, 25 foot length, will give 1,000 exposures of 16-mm. pictures; or by using the standard method of 8-mm. pictures you will have 4,000 pictures. Example: shooting one side of the 25 feet of film, then turning the film over and exposing the other side of the film.

Having described my invention reference should now be had to the following claims.

I claim:

1. In a camera adapted for taking single pictures using motion picture film:
   a frame mounting a lens and shutter assembly;
   a film cartridge removably mounted in the frame;
   said cartridge including a housing having an aperture in axial registry with said lens assembly and journalling film supply and take up reels for movably positioning a motion picture film in registry with said aperture;
   an elongated film support in said housing centrally of said aperture;
   an elongated film-engaging stripper plate spaced over and secured to said support having a central portion with a film opening adapted for registry with a single frame of a film movably positioned between said stripper plate and support;
   and manually operable means on said frame engageable with said film for intermittently advancing the same one frame at a time, said means including a film advance lever pivotally mounted on said frame.

2. In the camera of claim 1, a tripping lever connected to said shutter assembly;
   and linkage means interconnecting said manually operable means and tripping lever;
   initial movement of said latter means actuating said shutter, and additional movement successively advancing said film.

3. In the camera of claim 1, said stripper plate on opposite sides and longitudinally of its central portion being of reduced width, the apertured margins of said film extending laterally thereof;
   said manually operable means including a series of longitudinally spaced film drive pins adapted for projection into said film apertures and for driving engagement with said film.

4. In the camera of claim 3, a transversely movable spring-biased longitudinally-reciprocal first cam plate mounting said drive pins;
   and a cam guide housing in said frame slidably receiving said first cam plate.

5. In the camera of claim 3, a transversely movable, spring-biased, longitudinally-reciprocal first cam plate mounting said drivepins;
   a cam guide housing in said frame slidably receiving said first cam plate;
   and an adjustable stop on said frame limiting longitudinal feed movement of said first cam plate.

6. In the camera of claim 3, a transversely movable, spring-biased, longitudinally reciprocal first cam plate mounting said drive pins;
   a cam guide housing in said frame slidably receiving said first cam plate;
   said guide housing and first cam plate having cooperating pin and slot connections, by which said drive-pins, normally out of engagement with said film, move transversely into driving engagement with said film and longitudinally with the film;
   and spring means normally spacing said drive pins from said film.

7. In the camera of claim 3, a transversely movable, spring-biased, longitudinally-reciprocal first cam plate mounting said drive pins;
   a cam guide housing in said frame slidably receiving said first cam plate;
   said guide housing and first cam plate having cooperating pin and slot connections, by which said drive pins, normally out of engagement with said film, move transversely into driving engagement with said film and longitudinally with the film;
   spring means normally spacing said drive pins from said film;
   spring-biased, retractable, film positioning pins on said cartridge support retainingly registerable with said film apertures during film exposure;
   some of said drive pins being in axial registry with said positioning pins and adapted on said initial transverse movement of said first cam plate into operative engagement with said positioning means to retract the latter.

8. In the camera of claim 1, said stripper plate on opposite sides and longitudinally of its central portion being of reduced width, the apertured margins of said film extending laterally thereof;
   said manually operable means including a series of film drive pins adapted for projection into said film apertures and for driving engagement with said film;
   and a spring-biased pressure pad within said support in axial registry with said lens assembly normally urging said film into snug, sliding registry with said stripper plate.

9. In the camera of claim 3, a transversely movable, spring-biased, longitudinally-reciprocal first cam plate mounting said drive pins;
   a cam guide housing in said frame slidably receiving said first cam plate;
   an adjustable stop on said frame limiting longitudinal feed movement of said first cam plate;
   the spring bias for said first cam plate including first spring means mounted over said adjustable stop normally retaining said first cam plate in operative position, and adapted to automatically return said first cam plate to operative position on release of said manually operable means;

said spring bias also including second spring means on said support normally bearing against said first cam plate with its drive pins retracted from said film.

10. In the camera of claim 3, a transversely movable, spring-biased, longitudinally-reciprocal first cam plate mounting said drive pins;
a cam guide housing in said frame slidably receiving said cam plate;
a spring-biased second cam plate slidably mounted within said guide housing in normally opposed sliding engement with said first cam plate, and adapted on initial longitudinal movement for cooperative registry with said first cam plate for moving the same transversely and on further movement for moving said first cam plate longitudinally;
and a film advance lever pivotally mounted on said frame and connected to said second cam plate for reciprocally moving the same.

11. In the camera of claim 1;
said stripper plate being interchangeable with another stripper plate having a laterally displaced, reduced size film frame opening;
said lens assembly including a mounting plate having a series of angular slots;
and fasteners on said frame extending through said slots by which the axis of said lens assembly may be laterally adjusted for registry with the axis of said stripper plate opening for film registry.

12. In the camera of claim 1, a tripping lever connected to said shutter assembly;
and linkage means interconnecting said manually operable means and tripping lever;
initial movement of said latter means actuating said shutter, and additional movement successively advancing said film;
said manually operable means including a journal rod on said frame;
a master lever including a transverse bearing rotatably mounted on said journal rod;
said linkage means including a cable, at one end connected to said shutter tripping lever and at its other end wound partly around said bearing and secured thereto.

13. In the camera of claim 1, said manually operable means including a rotatable film adavnce wheel having a series of spaced pairs of sprockets therearound in operative driving engagement with said film;
said wheel adapted for incremental rotary movements in one direction.

14. In the camera of claim 1, said manually operable means including a rotatable film advance wheel having a series of spaced pairs of sprockets therearound in operative driving engagement with said film;
said wheel adapted for incremental rotary movements in one direction;
a journal rod on said frame upon which said wheel is mounted;
and a film advance and shutter trip master lever pivotally mounted on said journal rod and operably connected to said film advanced wheel.

15. In the camera of claim 14, said operable connection including a ratchet wheel coaxially mounted on said film advance wheel;
and a spring-biased, yieldable ratchet drive pin mounted on said lever for intermittent, incremental driving engagement with said ratchet on each advance pivotal movement of said lever.

16. In the camera of claim 14, said operable connection including a ratchet wheel coaxially mounted on said film advance wheel;
a spring-biased, yieldable ratchet drive pin mounted on said lever for intermittent, increment driving engagement with said ratchet on each advance pivotal movement of said lever;
and spring means connected to said lever for effecting return movement thereof.

17. In the camera of claim 14, said operable connection including a ratchet wheel coaxially mounted on said film advance wheel;
a spring-biased, yieldable ratchet drive pin mounted on said lever for intermittent, incremental driving engagement with said ratchet on each advance pivotal movement of said lever;
and a retractable stop pin limiting rotary advance movement of said lever.

18. In the camera of claim 14, spring biased retractable film locating pins on said support retainingly registerable with said film aperture during film exposure;
a tranversely adjustable yoke connected to each pin;
a rotatable scotch yoke shaft eccentrically connected to said yoke;
and a coupling linkage interconnecting said lever and said scotch yoke shaft whereby rotation of said lever retracts said film locating pins.

19. In the camera of claim 14, said operable connection including a 16-mm. film drive ratchet wheel and an interconnected 8-mm. film drive ratchet wheel, both slidably keyed axially to said film advance wheel;
a spring-biased, yieldable ratchet drive pin yieldably mounted on said lever for intermittent, incremental driving engagement with one of said ratchet wheels on each advance pivotal movement of said lever;
and a shift fork connected to said ratchet wheels for positioning one of said ratchet wheels relative to said ratchet drive pin.

References Cited

UNITED STATES PATENTS

| | | | |
|---|---|---|---|
| 2,351,999 | 1/1945 | Nerwin | 95—31 |
| 3,106,142 | 10/1963 | Peterson | 95—31 |
| 3,301,628 | 1/1967 | Hellmund | 352—137 |

NORTON ANSHER, Primary Examiner

J. F. PETERS, JR., Assistant Examiner

U.S. Cl. X.R.

352—137, 169